United States Patent
Teodoro

(10) Patent No.: US 11,892,985 B2
(45) Date of Patent: Feb. 6, 2024

(54) COMPUTERIZED SYSTEMS AND METHODS FOR BI-DIRECTIONAL FILE SHARING AND SYNCHRONIZATION ON AND OVER A NETWORK

(71) Applicant: AVEVA Software, LLC, Lake Forest, CA (US)

(72) Inventor: Jose Lourenco Teodoro, Lake Forest, CA (US)

(73) Assignee: AVEVA Software, LLC, Lake Forest, CA (US)

( * ) Notice: Subject to any disclaimer, the term of this patent is extended or adjusted under 35 U.S.C. 154(b) by 529 days.

(21) Appl. No.: 17/022,858

(22) Filed: Sep. 16, 2020

(65) Prior Publication Data

US 2021/0081375 A1 Mar. 18, 2021

Related U.S. Application Data

(60) Provisional application No. 62/901,110, filed on Sep. 16, 2019.

(51) Int. Cl.
*G06F 16/18* (2019.01)
*G06F 16/17* (2019.01)
(Continued)

(52) U.S. Cl.
CPC ........ *G06F 16/1873* (2019.01); *G06F 16/113* (2019.01); *G06F 16/1734* (2019.01); *H04L 67/06* (2013.01); *H04L 67/1097* (2013.01)

(58) Field of Classification Search
CPC .............. G06F 16/1873; G06F 16/113; G06F 16/1734; H04L 67/06; H04L 67/1097
(Continued)

(56) References Cited

U.S. PATENT DOCUMENTS 7,062,515 B1 * 6/2006 Thomas .............. H04L 67/1095
707/951
7,319,536 B1 * 1/2008 Wilkins ............. H04N 1/32112
358/1.15
(Continued)

FOREIGN PATENT DOCUMENTS

JP 2019504401 A 4/2019
KR 1020130020015 A 2/2013

OTHER PUBLICATIONS

International Search Report and Written Opinion for corresponding PCT Application No. PCT/US2020/051050 dated Dec. 30, 2020, 9 pages.

*Primary Examiner* — Mark E Hershley
(74) *Attorney, Agent, or Firm* — Greenberg Traurig, LLP

(57) ABSTRACT

Disclosed are systems and methods for improving interactions with and between computers in content providing, searching and/or hosting systems supported by or configured with devices, servers and/or platforms. The disclosed systems and methods provide a novel framework that automatically and bi-directionally enables applications and devices to upload and access files from remote locations on a network, while synchronizing the stored files for access from the various applications, devices and locations. The disclosed framework enables files sharing and file synchronization between location to location, cloud to cloud, network to network, device to device, location to cloud and vice-versa, and some combination thereof. The disclosed synchronization framework is a cloud-based multi-tenant infrastructure that securely, efficiently and accurately hosts shared files for administrative, read/write and/or read only access from devices, locations and applications with access to the associated drive(s) in/on the cloud.

17 Claims, 6 Drawing Sheets

(51) Int. Cl.
 *H04L 67/1097* (2022.01)
 *G06F 16/11* (2019.01)
 *H04L 67/06* (2022.01)

(58) Field of Classification Search
 USPC .......................................................... 707/695
 See application file for complete search history.

(56) References Cited

U.S. PATENT DOCUMENTS

| | | | | |
|---|---|---|---|---|
| 8,135,930 | B1* | 3/2012 | Mattox | G06F 3/0617 |
| | | | | 711/100 |
| 8,977,596 | B2* | 3/2015 | Montulli | G06F 16/137 |
| | | | | 707/640 |
| 9,141,823 | B2* | 9/2015 | Dawson | H04L 9/00 |
| 10,049,414 | B2* | 8/2018 | Cohen | G06F 21/10 |
| 10,110,656 | B2* | 10/2018 | Sawyer | G06F 16/1774 |
| 10,530,854 | B2* | 1/2020 | Savage | H04L 67/1095 |
| 10,558,667 | B2* | 2/2020 | Bender | G06F 8/65 |
| 2004/0172423 | A1 | 9/2004 | Kaasten et al. | |
| 2005/0091287 | A1* | 4/2005 | Sedlar | G06F 16/188 |
| 2006/0070019 | A1* | 3/2006 | Vishnumurty | G06F 16/21 |
| | | | | 717/101 |
| 2006/0230030 | A1* | 10/2006 | Volpa | G06F 16/9577 |
| | | | | 709/215 |
| 2007/0028302 | A1* | 2/2007 | Brennan | G06F 21/55 |
| | | | | 726/24 |
| 2008/0215528 | A1* | 9/2008 | Sedlar | G06F 16/176 |
| 2009/0113412 | A1* | 4/2009 | Shribman | G06F 16/10 |
| | | | | 717/170 |
| 2009/0271708 | A1* | 10/2009 | Peters | G06Q 10/10 |
| | | | | 715/738 |
| 2011/0173168 | A1* | 7/2011 | Jones | G06F 16/88 |
| | | | | 707/802 |
| 2011/0313972 | A1* | 12/2011 | Albouze | G06F 16/178 |
| | | | | 707/610 |
| 2013/0151596 | A1* | 6/2013 | Strong | H04L 67/06 |
| | | | | 709/206 |
| 2013/0290464 | A1* | 10/2013 | Barrall | G06F 15/167 |
| | | | | 709/213 |
| 2014/0181027 | A1* | 6/2014 | Whitehead | H04L 67/1095 |
| | | | | 707/639 |
| 2014/0188803 | A1* | 7/2014 | James | G06F 16/178 |
| | | | | 707/638 |
| 2014/0379586 | A1* | 12/2014 | Sawyer | G06F 16/168 |
| | | | | 705/301 |
| 2015/0127607 | A1* | 5/2015 | Savage | G06F 16/245 |
| | | | | 707/693 |
| 2015/0356110 | A1* | 12/2015 | Lin | G06F 16/122 |
| | | | | 707/704 |
| 2015/0370827 | A1* | 12/2015 | Parkison | G06F 16/178 |
| | | | | 707/610 |
| 2016/0070741 | A1* | 3/2016 | Lin | G06F 16/183 |
| | | | | 707/638 |
| 2016/0306707 | A1* | 10/2016 | Vijayan | G06F 16/1748 |
| 2017/0187656 | A1* | 6/2017 | Bastide | H04L 67/141 |
| 2017/0200122 | A1* | 7/2017 | Edson | H04L 63/104 |
| 2017/0364681 | A1* | 12/2017 | Roguine | G06F 21/566 |
| 2018/0103096 | A1* | 4/2018 | Micucci | H04L 67/02 |
| 2018/0137139 | A1* | 5/2018 | Bangalore | G06F 16/2379 |
| 2018/0373770 | A1* | 12/2018 | Switzer | G06F 16/27 |
| 2019/0065526 | A1* | 2/2019 | Ribeiro | G06F 16/183 |
| 2023/0112569 | A1* | 4/2023 | Blom | G06F 16/951 |
| | | | | 707/758 |

* cited by examiner

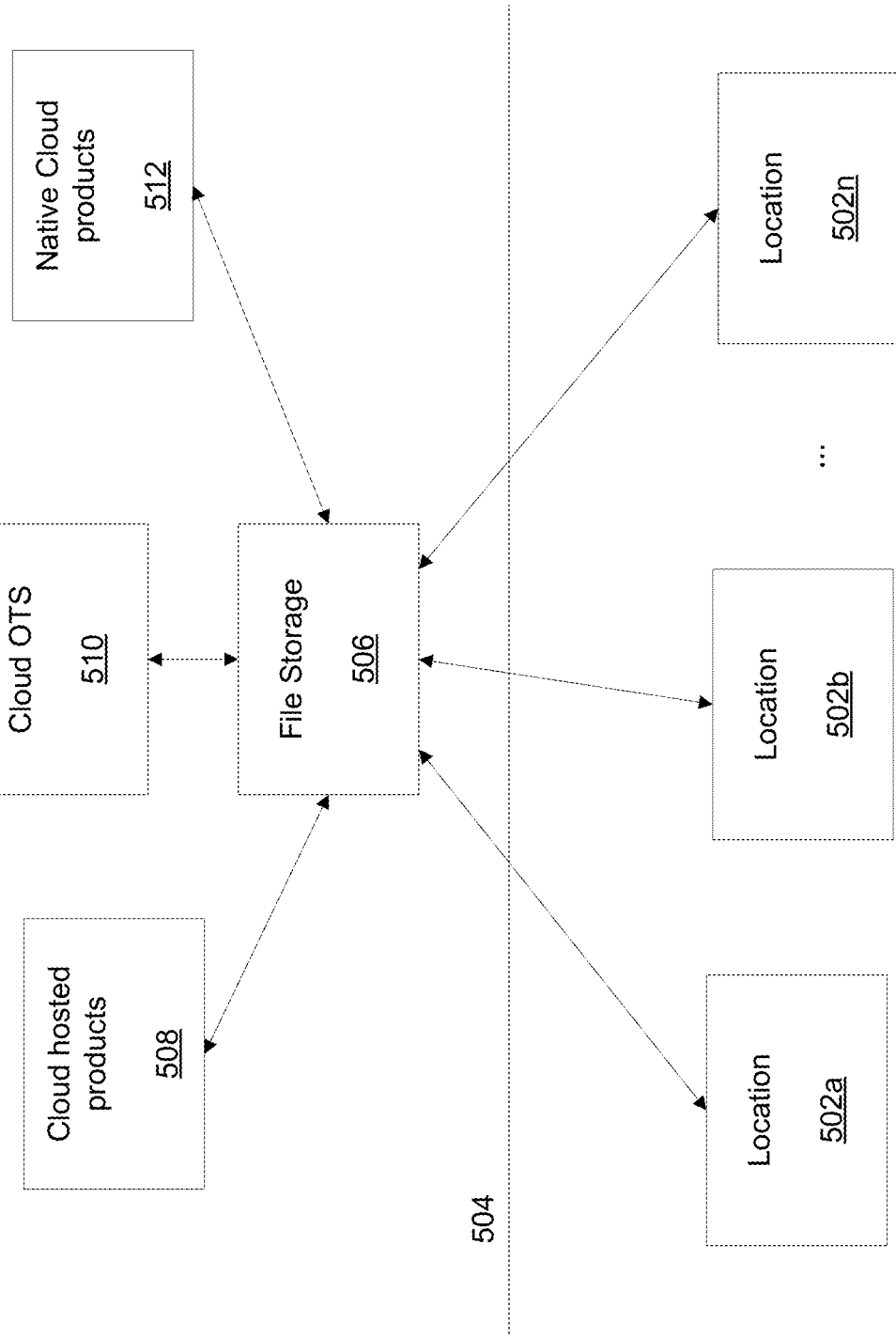

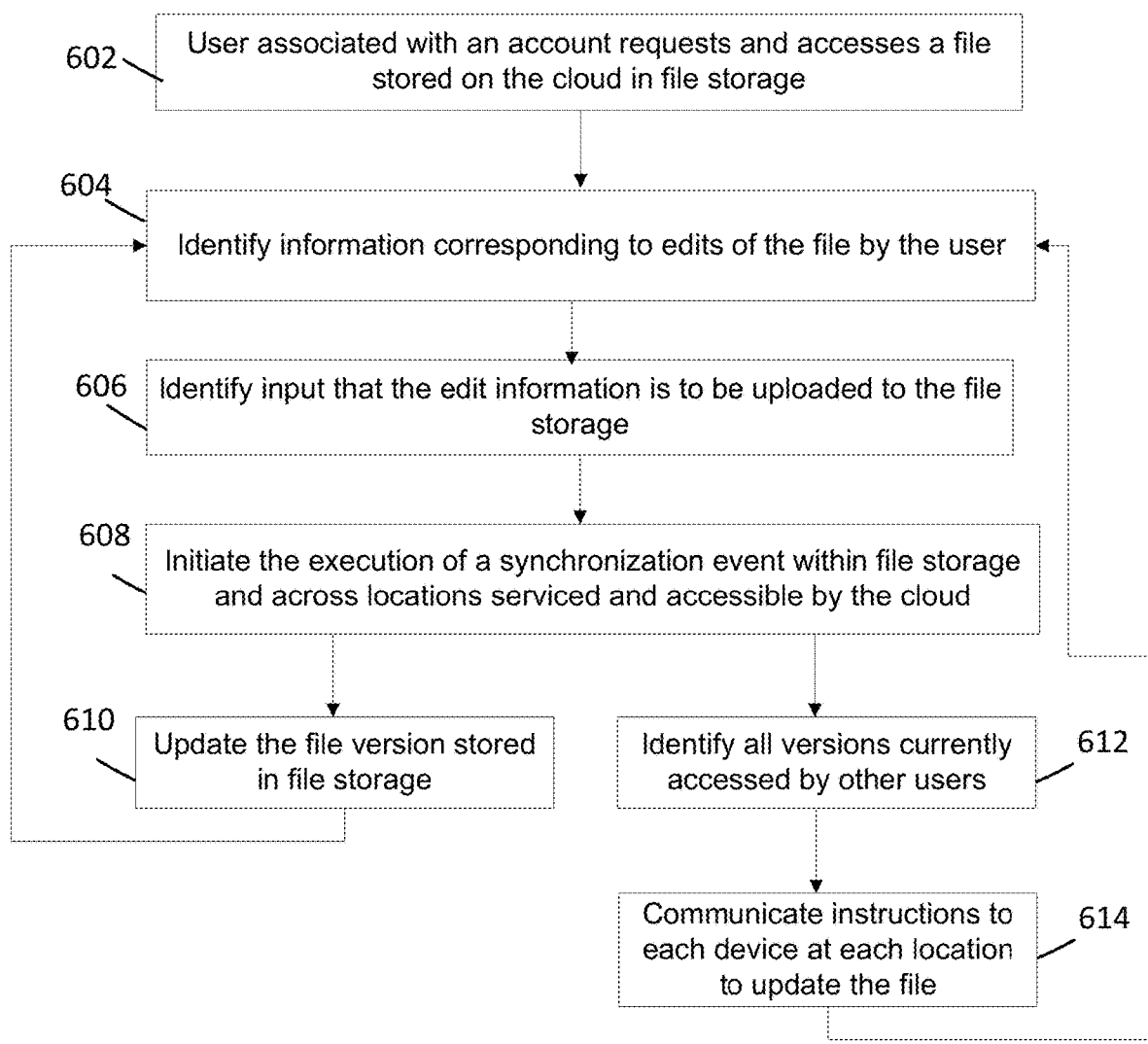

COMPUTERIZED SYSTEMS AND METHODS FOR BI-DIRECTIONAL FILE SHARING AND SYNCHRONIZATION ON AND OVER A NETWORK

CROSS-REFERENCE TO RELATED APPLICATIONS

This application claims the benefit of priority from U.S. Provisional Application No. 62/901,110, filed Sep. 16, 2019, entitled "Resource Server and System," which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

Some embodiments relate generally to improving the performance of network-based computerized content hosting and providing devices, systems and/or platforms by modifying the capabilities and providing non-native functionality to such devices, systems and/or platforms through a novel and improved multi-tenant framework for automatically and bi-directionally uploading, synchronizing and accessing files between local and/or network-hosted applications and devices.

BACKGROUND

Engineering, research and development and other commercial activities produce a large number of external files. For example, electronic documents are created from many different tools. The documents can include, but are not limited to, drawings, lists and isometrics, for example. Some of these are informal, but most them are formal (and can be confidential and/or classified) documents and need to be treated accordingly. This means they need to be imported, hosted and secured within a document management system. This provides a central searchable place for all produced engineering documents, and it also manages permissions and applies workflows, such as, for example, distribution to departments, contractors, fabricators, vendors, and the like.

Conventional systems typically perform such hosting and storage by utilizing a shared or networked folder that is monitored for uploads by users. These folders typically have metadata associated with the file, such that the file and its associated metadata can be stored in association with each other, or at least with reference to a look-up table (LUT) that is part of the folder's configuration.

Under such conventional systems, for example, when a document/drawing gets processed, the metadata can be read to fill in the information associated to the document. However, it is computationally difficult for the folder's server and/or administrative processor to provide accurate updating or augmentation of files as the volumes are typically extremely and computationally draining high for a folder (e.g., an organization's document hosting job/task). For example, some organizations readily reach between 50,000 and 300,000 documents/drawings processed in this manner.

Existing technological challenges when using such tools in the Cloud, for example, can be based on or a product of it being a sandboxed environment. For example, a document can be produced, it can be manually downloaded, but this complicated, time-consuming, error-prone and almost impossible for users are administrators to manage due to the large numbers of complex documents. Another challenge is that customers will not move all the projects to the Cloud overnight. This means that the existing way of processing this data will continue to exist and cause drains on network and device resources in maintaining the accuracy, availability and security of such documents.

SUMMARY

Some embodiments provide a novel framework that automatically and bi-directionally enables applications and devices to upload and access files from remote locations on a network, while synchronizing the stored files for access from the various applications, devices and locations.

For purposes of this disclosure, reference will generally be made to files that are created and uploaded by users, applications and devices, and include both data and metadata related to electronic information contained in the electronic (or digital) files. One of ordinary skill in the art would understand that such files and take any form, whether known or to be known, such as, but not limited to, electronic documents, images, text, audio, video, multi-media, graphics, electronic messages, exchange files, CAD (computer-aided design) files (e.g., STEP/IFC (Standard for Exchange of Product Model Data/Industrial Foundation Classes) files, steel detail neutral files (SDNF) files, and the like), tag lists, and the like, or some combination thereof. One of ordinary skill in the art would also understand that such files can include, but are not limited to, including any type of known or to be known electronic content, including, but not limited to, images, text, graphics, multi-media, material files, drawings, geometrical exports, exchange data, SaaS (software-as-a-service) data, PaaS (platform-as-a-service) data, IaaS (infrastructure-as-a-service) data, file-transfer-protocol (FTP) data, and the like, or some combination thereof.

Some embodiments provide a novel framework that is configured for synchronization between devices, applications, systems and platforms both on-premises ("on-prem" or local devices/storage) and/or hosted on a network (e.g., a cloud platform, service or platform). In some embodiments, the disclosed systems and methods embodied and executed through the disclosed framework can be configured to replicate data between locations, which can include local and/or networked locations, such as on-premises sites and the Cloud.

For purposes of this disclosure, locations may be referred to as "endpoints", such that an endpoint can refer to devices, applications, locations, or some combination thereof, for example, that shares data with another endpoint. For example, one endpoint may be a user's smart phone at a jobsite, while another endpoint can be the central server for a manufacturing plant. As will be discussed in detail herein, the data from these endpoints can be shared and synchronized from endpoint to endpoint.

In some embodiments, when data is synchronized between two endpoints, a new synchronization instance may be created. Such instance may be automatically created by a cloud server, or can be created by a system administrator, for example. The synchronization instance defines a synchronization event between two endpoints, for example, one being on-premises and the other being a cloud service (e.g., AVEVA Connect®). The contents between these two locations are then continuously or periodically synchronized, whereby such synchronization can occur periodically according to a time period or dynamically adjusted time period, according or in response to a customer or administrator's request, upon completion of a task, saving of a document, or a threshold amount of time passing since the last synchronization, and the like, or some combination thereof. According to some embodiments, a synchronization event involves the cloud storage being exposed to the services associated with the hosting system (e.g., AVEVA Connect®) so that they can both read and write to the desired destination.

In some embodiments, the disclosed framework is configured for executing and providing systems and methods that provide capabilities for: on-prem sync to the cloud, vice-versa, on-prem to on-prem, and cloud to cloud, and the like; enable ubiquitous access to the cloud from both on-prem and network devices; enable the sharing and access of data across locations, devices, networks, and users, and the like. Some embodiments also enable third party and native applications access to the cloud framework for accessing, uploading and synchronizing their data (e.g., read and write privileges) within the cloud and across endpoints.

Thus, some embodiments are configured for both internal (e.g., AVEVA® products and services) and external services to access, store and retrieve data from the proprietary cloud infrastructure disclosed herein. Some embodiments enable file sharing between location to location, cloud to cloud, device to device, device to cloud, cloud to device, network to network, and the like. Some embodiments also enable versioning, as discussed in more detail below, such that all changes to the shared files and/or cloud service accessed by all parties/entities are properly and timely dispersed to each user, device, platform or service.

According to some embodiments, the cloud framework's storage is configured for enabling permissions to control how and to which types of data certain users, devices, premises, services and platforms can access and in what manner such access is granted/denied. In some embodiments, the storage configuration within the cloud can be segmented whereby only certain parties/entities with particular permissions can read or write to such sections, or even receive updates upon another party/entity writing to such section.

In some embodiments, permissions assigned, for example, accounts can be global or account specific. For example, a user can be provided access to all hosted documents (e.g. global access). In another example, a user working at a particular plant (e.g., on-prem) may only be granted access to documents uploaded and shared by users associated with that particular plant. In some embodiments, users an be granted different types of access—for example, administrative: users are provided ability to create new drives, restore or delete files, and the like; read/write: user can read and write to a drive by contributing files; and read: user can only read files.

In some embodiments, the files stored in the cloud can be archived and/or backup-up periodically or according to another type of input that causes a back-up to occur (e.g., a time period or request, for example).

In some embodiments, the cloud infrastructure can be configured according to any known or to be known cloud or database management architecture, infrastructure or management configuration, including, but not limited to, Blockchain, binary large object (BLOB) storage, files storage, or any other type of cloud database management system architecture, as understood by those of skill in the art. In some embodiments, such infrastructure can enable navigation of types of data related to types of services, products and/or hosting entities while providing security protocols (e.g., AVEVA® SDK) that control whether navigation to such type of data is accessible.

According to some embodiments, the storage provided by the disclosed framework can be configured to provide a scaled amount of storage per account, per location or per usage. The scaled amount can be set and can dictate how much data can be stored. In some embodiments, the scaled amount can be dynamically adjusted based on usage, and the integrity of such usage or access by the users of the account.

By way of a non-limiting example, an account of a plant is provided 10 GB of storage. When this limit of data is being approached, a notification can be provided to the users or an administrator of the account. In some embodiments, the storage limit can be increased. This increase can be permanent, or can be only for a short time period (e.g., a grace period). In some embodiments the amount of storage, the amount granted during a grace period or additionally provided to an account can be based on a variety of factors, including, but not limited to, number of users accessing the account, amount of data being uploaded, amount of memory used for upload (e.g., 10% threshold), amount of CPU usage for upload (e.g., 10% threshold), frequency of uploaded, strength of network connection, network bandwidth consumed during uploaded, security breaches, time of uploads, payments, ad-hosting, and the like, or some combination thereof.

Some embodiments provide computerized methods for a novel multi-tenant framework for automatically and bi-directionally uploading, synchronizing and accessing files between local or network-hosted applications and devices.

According to some embodiments, a method comprises: receiving, at a computing device over a network, a request from a first device to access a file stored in a database, the first device being associated with a first location, the database being associated with the computing device; communicating, by the computing device over the network, a version of the file to the first device; receiving, by the computing device, from the first device, information indicating that the first device has modified the file version; automatically updating, by the computing device, upon receiving the information, the file stored in the associated database, the updating comprising modifying the stored file to included edits performed in the file version; identifying, by the computing device, upon receiving the information, another version of the file previously communicated to a second device associated with a second location; and automatically communicating, upon identifying the other file version, by the computing device over the network, edit information to the second device, the edit information causing the other file version at the second location to be updated to incorporate the edits performed in the file version at the first location.

In some embodiment, the method further comprises: creating, via the computing device, a new version of the file in response to receiving the information from the first device, the new version being an updated version of the file that includes the edits; and archiving, via branch controls executed by the computing device and associated with the database, the file provided to the first device on the network, such that the created new version is accessible within the database as a latest version of the file.

In some embodiments, the automatic updating of the file within the database is based on the creating and archiving steps.

In some embodiments, the communicated edit information to the second device comprises information associated with the created new version.

In some embodiments, the computing device interacts with the first and second devices over the network via an application program interface (API) that is associated with and manages the database.

In some embodiments, the computing device comprises functionality for accessing a set of native and third party products, services and platforms, wherein the functionality enables the first device and the second device access to the set of native and third party products, services and platforms.

In some embodiments, the received information from the first device corresponds to a new version of the file created by the first device.

In some embodiments, the second location is the same as the first location.

In some embodiments, the second location is a different location from the first location.

In some embodiments, the second location is a networked location.

In some embodiments, the second location corresponds to a third party cloud service.

In some embodiments, the method further comprises: analyzing the request from the first device; and determining, based on the analysis, whether the first device is permitted to access the file, wherein the communication of the file to the first device is based on the determination.

In some embodiments, the first and the second location each correspond to at least one of a real-world location and an electronic location on the network.

In some embodiments, the receiving of the information indicating that the first device has modified the file version from the first device corresponds to a digital event selected from a group consisting of: an upload by the first device, a time period, an auto-save event, detection of a threshold amount of edits being performed, a request from the computing device, and a threshold amount of time passing since a last synchronization by the computing device.

Some embodiments provide a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, email server, ad server, content server and/or client device, and the like) cause at least one processor to perform a method for a novel and improved framework for multi-tenant framework for automatically and bi-directionally uploading, synchronizing and accessing files between local or network-hosted applications and devices.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 5 illustrates a non-limiting embodiment of network architecture and configuration according to some embodiments of the present disclosure; and FIG. 6 is a block diagram illustrating an exemplary data flow in accordance with some embodiments of the present disclosure.

DESCRIPTION OF EMBODIMENTS

Figure 1:
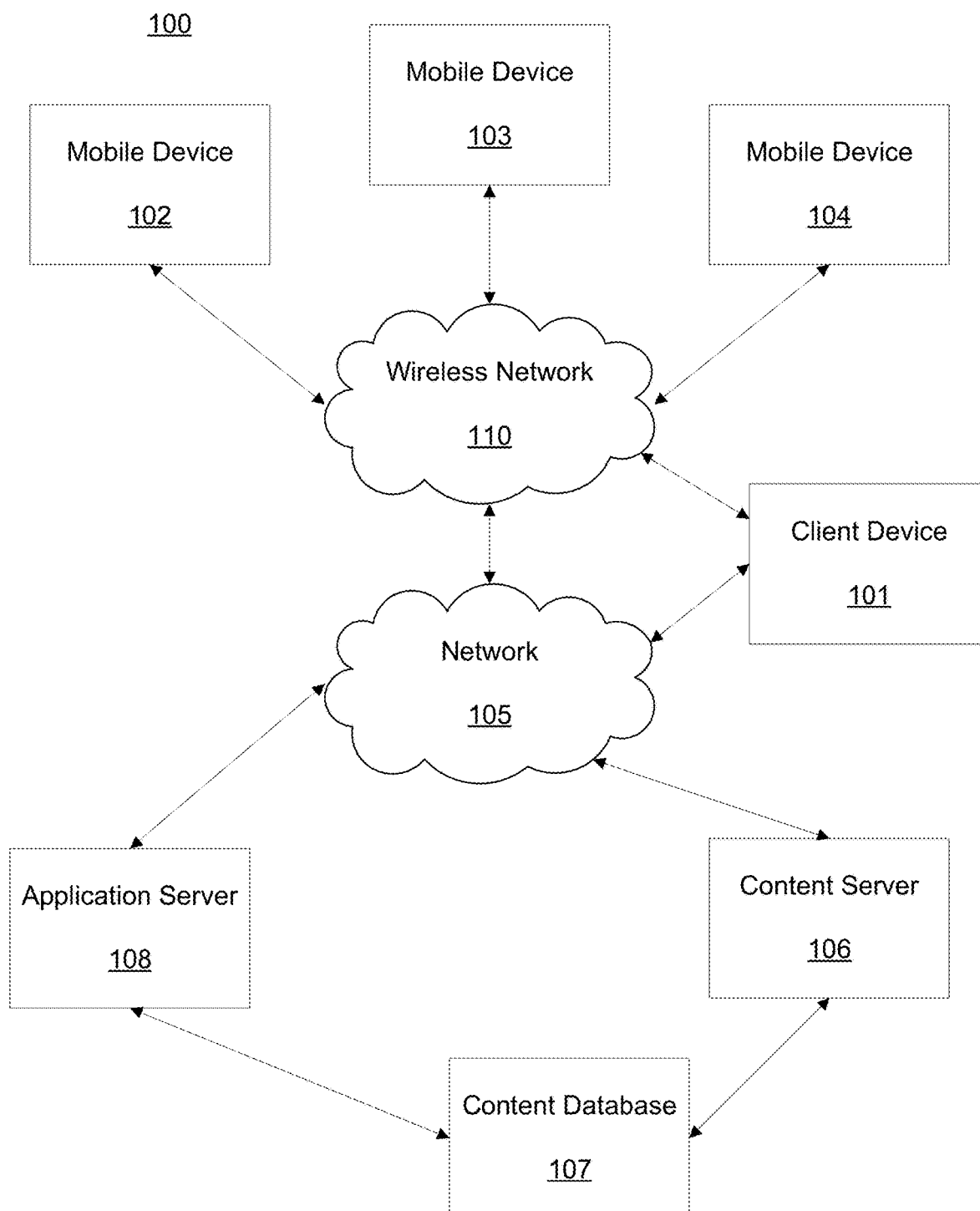
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the,"

again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with some embodiments of the present disclosure is shown. FIG. 1 shows components of a general environment in which the systems and methods discussed herein may be practiced.

Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

Some embodiments of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In some embodiments, such communications may include sending and/or receiving messages, creating and uploading documents, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

In some embodiments, wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

In some embodiments, network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. In some embodiments, content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, application server 108, for example, can store various types of applications and application related information including application data and user profile information (e.g., identifying, generated and/or observed information associated with a user).

In some embodiments, content server 106 and app server 108 can store various types of data related to the content and services each provide, observe, identify, determine, generate, modify, retrieve and/or collect. Such data can be stored in an associated content database 107, as discussed in more detail below.

In some embodiments, server 106 and/or 108 can be embodied as a cloud server or configured for hosting cloud services, as discussed herein.

In some embodiments, the network 105 is also coupled with/connected to a Trusted Search Server (TSS) which can be utilized to render content in accordance with the embodiments discussed herein. Embodiments exist where the TSS functionality can be embodied within servers 106 and 108.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in some embodiments, servers 106 and 108 may be integrated into a single computing device, without departing from the scope of the present disclosure.

Additionally, while the illustrated embodiment in FIG. 1 depicts only servers 106 and 108, it should not be construed as limiting, as any type and number of servers can be included therein.

Figure 2:
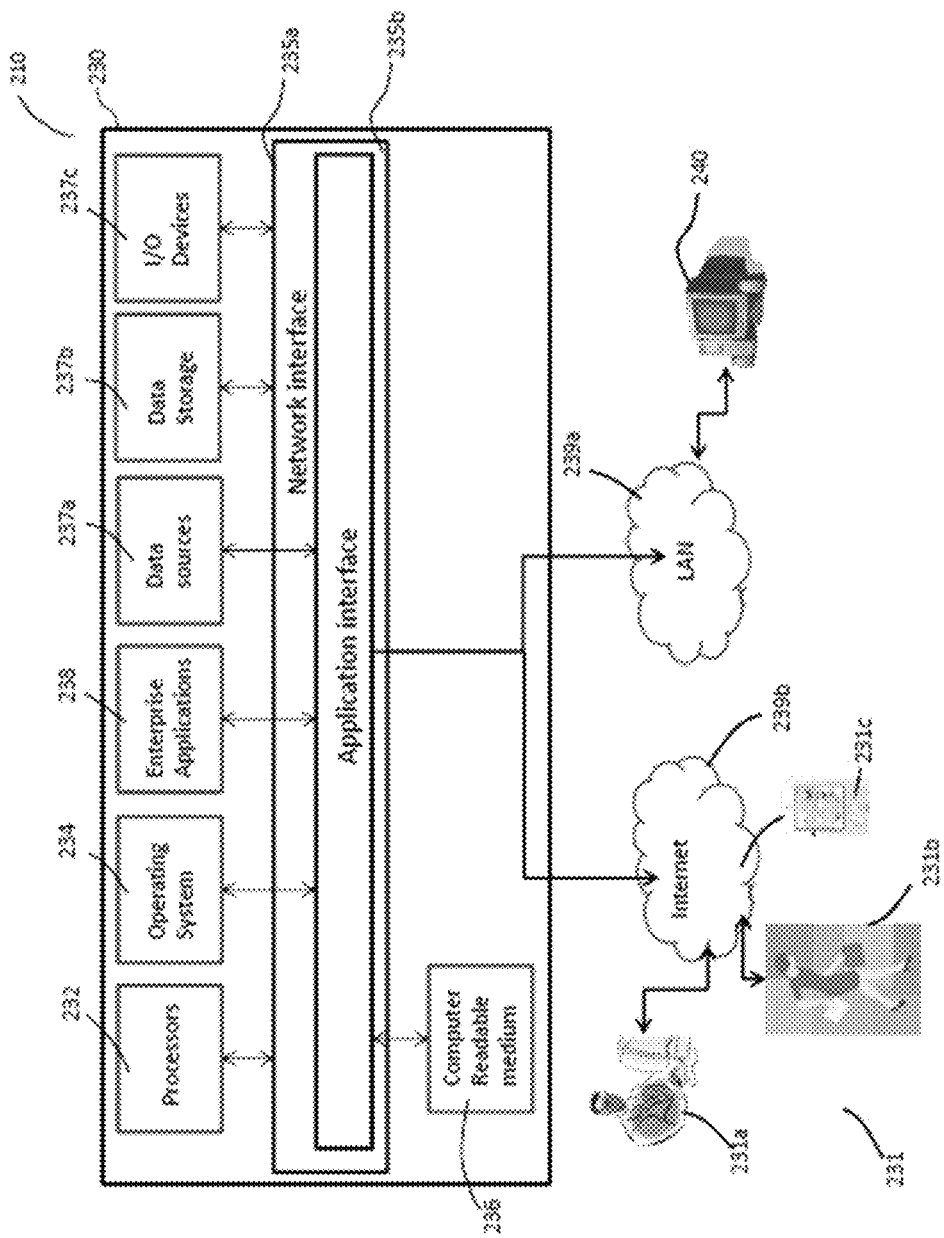
FIG. 2 is a schematic diagram illustrating an example of a network within which the systems and methods disclosed herein could be implemented according to some embodiments of the present disclosure.

Turning to FIG. 2, computer system 210 is depicted and is a non-limiting example embodiment of system 100 discussed above in relation to FIG. 1.

FIG. 2 illustrates a computer system 210 enabling or operating a responsive layout system and server (see also FIG. 5 discussed below) according to some embodiments. In some embodiments, computer system 210 can include and/or operate and/or process computer-executable code of one or more of the above-mentioned program logic, software modules, and/or systems. Further, in some embodiments, the computer system 210 can operate and/or display information within one or more graphical user interfaces. In some embodiments, the computer system 210 can comprise a cloud server and/or can be coupled to one or more cloud-based server systems.

In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that some embodiments can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on non-transitory computer-readable storage media within the system 210 and on computer-readable storage media coupled to the system 210.

In some embodiments, the system 210 can comprise at least one non-transitory computer readable medium 236 coupled to at least one data source 237a, and/or at least one data storage device 237b, and/or at least one input/output device 237c. In some embodiments, the disclosed systems and methods can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, at least one of the software modules 238 can be configured within the system to output data to at least one user 231 via at least one graphical user interface rendered on at least one digital display.

In some embodiments, the non-transitory computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

Figure 3:
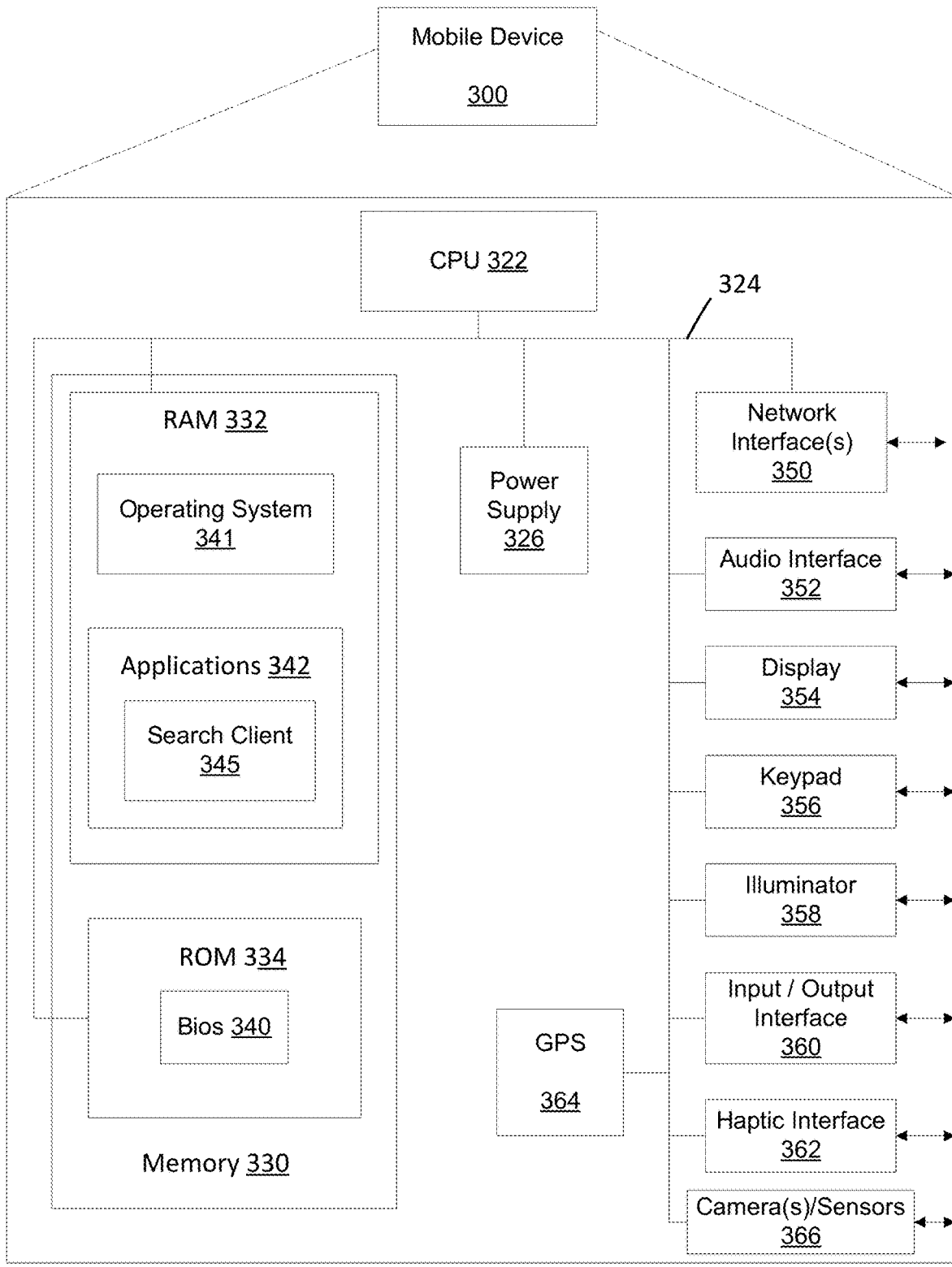
FIG. 3 depicts is a schematic diagram illustrating an example of client device in accordance with some embodiments of the present disclosure.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some embodiments, the user 231 can comprise a mobile user 231b coupled to the system 210. In some embodiments, the user 231b can use any mobile computing device 231c to wirelessly coupled to the system 210, including, but not limited to, personal digital assistants, and/or cellular phones, mobile phones, or smart phones, and/or pagers, and/or digital tablets, and/or fixed or mobile internet appliances FIG. 3 is a schematic diagram illustrating a client device showing an example embodiment of a client device that may be used within the present disclosure. Client device 300 may include many more or less components than those shown in FIG. 3. However, the components shown are sufficient to disclose an illustrative embodiment for implementing the present disclosure. Client device 300 may represent, for example, client devices discussed above in relation to FIGS. 1-2.

As shown in FIG. 3, in some embodiments, Client device 300 includes a processing unit (CPU) 322 in communication with a mass memory 330 via a bus 324. In some embodiments, Client device 300 also includes a power supply 326, one or more network interfaces 350, an audio interface 352, a display 354, a keypad 356, an illuminator 358, an input/output interface 360, a haptic interface 362, an optional global positioning systems (GPS) receiver 364 and a camera (s) or other optical, thermal or electromagnetic sensors 366. Device 300 can include one camera/sensor 366, or a plurality of cameras/sensors 366, as understood by those of skill in the art. Power supply 326 provides power to Client device 300.

Client device 300 may optionally communicate with a base station (not shown), or directly with another computing device. Network interface 350 is sometimes known as a transceiver, transceiving device, or network interface card (NIC).

In some embodiments, audio interface 352 is arranged to produce and receive audio signals such as the sound of a human voice. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. Illuminator 358 may provide a status indication and/or provide light.

In some embodiments, client device 300 also comprises input/output interface 360 for communicating with external. Input/output interface 360 can utilize one or more communication technologies, such as USB, infrared, Bluetooth™, or the like. In some embodiments, haptic interface 362 is arranged to provide tactile feedback to a user of the client device.

Optional GPS transceiver 364 can determine the physical coordinates of Client device 300 on the surface of the Earth, which typically outputs a location as latitude and longitude values. GPS transceiver 364 can also employ other geo-positioning mechanisms, including, but not limited to, triangulation, assisted GPS (AGPS), E-OTD, CI, SAI, ETA, BSS or the like, to further determine the physical location of Client device 300 on the surface of the Earth. In some embodiments, however, Client device may through other components, provide other information that may be employed to determine a physical location of the device, including for example, a MAC address, Internet Protocol (IP) address, or the like.

In some embodiments, mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of Client device 300. The mass memory also stores an operating system 341 for controlling the operation of Client device 300.

In some embodiments, memory 330 further includes one or more data stores, which can be utilized by Client device 300 to store, among other things, applications 342 and/or other information or data. For example, data stores may be employed to store information that describes various capabilities of Client device 300. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 300.

In some embodiments, applications 342 may include computer executable instructions which, when executed by Client device 300, transmit, receive, and/or otherwise process audio, video, images, and enable telecommunication with a server and/or another user of another client device. In some embodiments, applications 342 may further include search client 345 that is configured to send, to receive, and/or to otherwise process a search query and/or search result.

Having described the components of the general architecture employed within some embodiments, the components' general operation with respect to some embodiments will now be described below.

Figure 4:
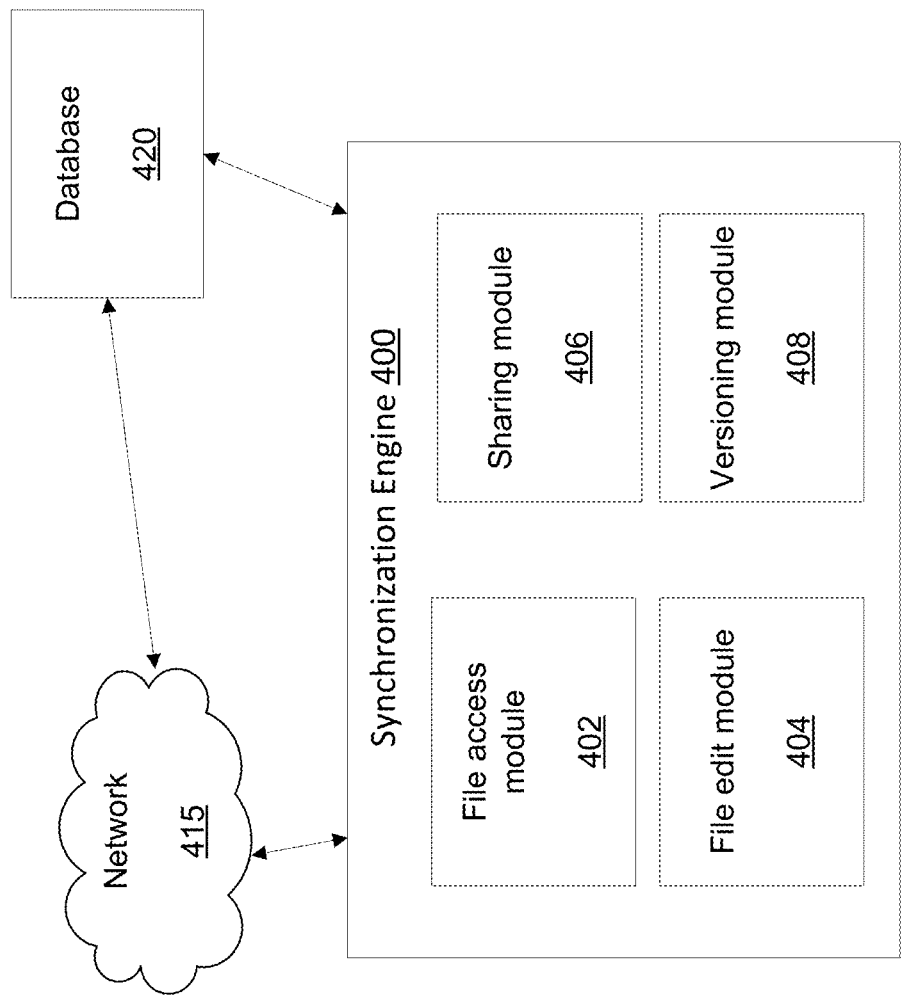
FIG. 4 is a block diagram illustrating components of an exemplary system in accordance with embodiments of the present disclosure.

FIG. 4 is a block diagram illustrating the components of some embodiments. FIG. 4 includes synchronization engine 400, network 415 and database 420. The synchronization engine 400 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, synchronization engine 400 can be embodied as a stand-alone application that executes on a server and/or user device (e.g., on a cloud server and/or on-prem on a user device of local storage). In some embodiments, the synchronization engine 400 can function as an application installed on a device; and, in some embodiments, such application can be a web-based application accessed by a device over a network.

The database 420 can be any type of database or memory, and can be associated with a content server on a network (e.g., content server, a search server or application server) or a user's device (e.g., device 101-104 or device 200 from FIGS. 1-2). Database 420 comprises a dataset of data and metadata associated with local and/or network information related to users, services, applications, content and the like. Such information can be stored and indexed in the database 420 independently and/or as a linked or associated dataset. As discussed above, it should be understood that the data (and metadata) in the database 420 can be any type of information and type, whether known or to be known, without departing from the scope of the present disclosure.

According to some embodiments, database 420 can store data and metadata associated with users, files, projects, versions, synchronization events, schedules, images, videos, text, messages, products, items and services from an assortment of media and/or service providers and/or platforms, and the like.

As discussed above, with reference to FIGS. 1-2, the network 415 can be any type of network such as, but not limited to, a wireless network, a local area network (LAN), wide area network (WAN), the Internet, or a combination thereof. The network 415 facilitates connectivity of the synchronization engine 400, and the database of stored resources 420. Indeed, as illustrated in FIG. 4, the synchronization engine 400 and database 420 can be directly connected by any known or to be known method of connecting and/or enabling communication between such devices and resources.

The principal processor, server, or combination of devices that comprises hardware programmed in accordance with the special purpose functions herein is referred to for convenience as synchronization engine 400, and includes file access module 402, file edit module 404, sharing module 406 and versioning module 408. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 5, system 500 provides a non-limiting embodiment of network architecture and configuration according to some embodiments. System 500 provides a non-limiting example of interactions between devices at locations 502a-502n, which for purposes of this example, are on-premises locations, and the cloud storage provided as file storage 506.

In some embodiments, storage 506 an be configured as a multi-tenant database that can perform synchronization action between multiple devices that includes reconciling the current state of the list of data objects with corresponding data objects in the multi-tenant database without further (i.e., independent of) user action. In some embodiments, storage 506 can execute engine 400 which can be configured to monitor files and directories in the subset of the multi-tenant database and in computing devices associated with locations 502a-502n, and to reconcile updated files in real time.

As discussed herein, storage 506, cloud hosted products 508, cloud operating training simulator (OTS) 510 and native cloud products 512 are hosted on a network (e.g., the Internet), whereas devices associated with locations 502a-502n are local devices that connect with the network to access file storage 506 and its associated elements 508-512, and the like. Thus, line 504 provides an indication of a network connection is required to connect to the cloud within system 500 (e.g., locations 502a-502n connect via a network(s) to storage 506).

As discussed in more detail below, in some embodiments, each location (502a-502n) can have non-file-based products, for example, but not limited to, AppServer and InTouch/Common Graphics, installed therein, such that they can interact with an application program interface(s) (API) executing in association with storage 506 (e.g., Representational State Transfer (REST) API). Such interaction can enable the synchronization enabled via engine 400, as discussed below, at least in relation to Process 600 of FIG. 6.

According to some embodiments, the configuration of system 500 enables on-prem to on-prem interaction, file sharing and synchronization. For example, location 502a can upload a document to file storage 506, which can then be accessed and downloaded by location 502b.

In some embodiments, locations 502a-502n can refer to devices at the same location (e.g., the same plant), all or a portion of which have access to the drive of data within file storage 506. In some embodiments, locations 502a-502n can refer to different locations (e.g., different plants and/or third party plants with no affiliation), all with different degrees of access privileges, as discussed above.

In some embodiments, through the configuration of system 500, each user, via their device at their respective location (e.g., 502a-50n), can bi-directionally share content by uploading and downloading files and their associated data and metadata through the network hosted file storage 506. In some embodiments, this enables on-prem to on-prem file sharing through the cloud. In some embodiments, users can share files with other users at the same location. In some embodiments, files (e.g., data/metadata) can be shared between users at different locations.

According to some embodiments, this enables two (or more users) to be working on the same document (in some embodiments, at the same time), and be provided with the most up to date and accurate data of the document (or project/task). In some embodiments, the integration of the file storage 506 between each user (e.g., locations 502a-502n) provides functionality that enables the file storage 506 (via synchronization engine 400, as discussed below) to control how, when and to what degree files can be accessed, edited and/or even visible to requesting users, services, platforms or locations, and the like.

In some embodiments, a location (502a-502n) can be associated with another service, platform or cloud service, for example. Thus, rather than only users (and their associated devices) being able to access the storage 506, other types of services, cloud servers and platforms can access the file storage 506. Thus, in addition to on-prem to on-prem file sharing, system 500 enables files sharing and synchronization between locations that are on-prem to cloud, cloud to on-prem, cloud to cloud, and the like, or some combination thereof, as discussed above.

System 500's configuration and infrastructure of storage 506, therefore, in some embodiments, supports any known or to be known network configuration and/or network connection management protocol where any type, quantity and/or frequency of devices, users, servers, platforms or services can access and utilize a drive(s) to host data for synchronization between multiple locations (whether real-world or digital locations).

According to some embodiments, as depicted in FIG. 5, file storage 506 is associated with native cloud products 512. In some embodiments, the native cloud products 512 can be directly connected or associated with storage 506 (e.g., stored within a component or drive of storage 506); and, in some embodiments, native cloud products 512 can be stored in a separate data store or server, and accessible via a network by storage 506.

As understood by those of ordinary skill in the art, in some embodiments, native cloud products 512 includes, without limitation, APIs, agile methodologies, microservices, cloud platforms, containers, security features, tools, and any other type of known or to be known application development or deployment by a hosting party of storage 506. In some embodiments, native cloud products 512 enables storage 506 to provide, for example, PaaS functionality to locations 502a-502n.

Accordingly, in some embodiments, each location 502-502n can access the native cloud products 512 via the network hosted storage 506. This enables each location access to the same products at a cost saving configuration, such that they can be web-enabled, downloadable from a central location on a network, and available to all permitted users, services and/or platforms executing at each location 502a-502n. In some embodiments, this eliminates the computationally draining and network bandwidth clogging need to export/import or manually upload cycles of native cloud products 512 and/or files associated therewith.

In some embodiments, native cloud products 512 can be configured to access data stored in storage 506 via storage 506's API(s), which enables access to data uploaded from locations 502a-502n, shared from cloud hosted products 508, and/or enables transferring data back to locations 502a-502n.

According to some embodiments, as depicted in FIG. 5, file storage 506 is associated with Cloud OTS 510. In some embodiments, the Cloud OTS 510 can be directly connected or associated with storage 506 (e.g., stored within a component or drive of storage 506); in some embodiments, Cloud OTS 510 can be stored in a separate data store or server, and accessible via a network by storage 506.

As understood by those of ordinary skill in the art, in some embodiments, Cloud OTS 510 refers to a service or services that is part of an object management group (OMG) (e.g., Common Object Request Broker Architecture (CORBA)) that provides via various types of APIs a set of maintained standards that facilitates and/or controls cross-platform processes. In general, OTS helps to standardize the routine communications between various network components, such as, for example, between storage 506 and locations 502a-502n, between location 502a, location 502b and location 502n, and the like, or some combination thereof.

According to some embodiments, Cloud OTS 510 allows companies (e.g., locations 502a-502n) to onboard and train new operators, as well as to reinforce the training of experienced operators. This reduces training time (e.g., from months to days) because it allows multiple operators to be trained simultaneously.

According to some embodiments, as depicted in FIG. 5, file storage 506 is associated with cloud hosted products 508. In some embodiments, the cloud hosted products 508 can be directly connected or associated with storage 506 (e.g., stored within a component or drive of storage 506); in some embodiments, cloud hosted products 508 can be stored in a separate data store or server, and accessible via a network by storage 506.

As understood by those of ordinary skill in the art, in some embodiments, cloud hosted products 508 refer to applications, software, software kits, APIs, and the like, that have access to data stored within a drive(s) within storage 506 that was uploaded from location 502a-502n and/or shared from native cloud products 512 or cloud OTS 510. Products 508 can be sandboxed and configured to seamlessly transfer data to locations 502a-502n (e.g., to users on-prem, and vice-versa).

In some embodiments, file-based cloud hosted products 508 can access storage 506 according to access protocols associated with accessing a local or networked harddrive. In some embodiments, non-file-based products can use the storage 506's API(s) to access the data stored therein.

According to some embodiments, as discussed above, illustrated in FIG. 5 and discussed in more detail below, system 500 enables ubiquitous access to data stored within a drive of storage 506. That is, regardless of which mechanism is used to put the file into storage 506, it will be accessible through any known or to be known method, by the cloud hosted products 508, by a user/entity at location 502a-502n and/or via a native cloud product 512 (barring permissions stating/preventing otherwise).

In some embodiments, a location 502a-502n can have a local folder where file data and metadata is locally stored, then it is uploaded to storage 506. This storage can interact with storage 506 and act as a local data store for periodic upload or continuous synchronization. The storage and synchronization can be effectuated through interaction with storage 506's API.

In some embodiments, storage 506 can be configured to integrate, interact with or otherwise communicate with and transfer data between third party cloud storage vendors and/or external access services provided by third party suppliers (e.g., email, FTP, and the like). In some embodiments, these third party services and/or vendors can access storage either via a networked connection or through a direct connection (e.g., either side of line 504). In some embodiments, access can be facilitated to such vendors and/or third party services via storage 506's API's which enable locations 502a-502n to access and utilize the services data provided therein, and store the usage data in the associated drive in storage 506.

As discussed in more detail below in relation to FIG. 6, in some embodiments, system 500's configuration enables storage 506 to provide a service that replicates data between each locations 502a-502n. According to some embodiments, when data is created, shared and/or uploaded, engine 400 (e.g., embodied as an API executing in association with storage 506) is configured to create a new (or modify an existing) instance of a synchronization event which defines the synchronization between at least two locations (502a-502n, which act as endpoints).

According to some embodiments, the synchronization of contents between these locations 502a-502n can occur continuously as data is created, modified, deleted, or in accordance with any other form of input, timing, request or detected event. The cloud file storage 506 is exposed to the modules executing on each location's device (e.g., devices, servers executing at locations 502a-502n) so as to enable read/write access where applicable and/or permitted.

Turning to FIG. 6, Process 600 provides a non-limiting data flow of the methodology of synchronizing data between locations 502a-502n. According to some embodiments of Process 600, Step 602 is performed by the file access module 402 of synchronization engine 400; Steps 604-606 are performed by the file edit module 404; Step 610 is performed by the sharing module 406; and Steps 612-614 are performed by the versioning module 408.

According to some embodiments, Process 600 provides a methodology for automatically synchronizing data objects within a cloud-based and/or cloud-hosted computing environment. In some embodiments, the cloud infrastructure (as illustrated, for example, in FIGS. 1, 2 and 5), can include, but is not limited to, a server, a multi-tenant database, and computing devices connected to the multi-tenant database through a network.

In some embodiments, Process 600 includes running an application (engine 400) on the devices operating at locations 502a-502n which comprises networked synchronization functionality for maintaining persistent connectivity between storage 506 (e.g., the API(s) executed in connection with the multi-tenant database) and the devices at locations 502a-502n. In some embodiments, engine 400 can be executed at the network level in order to off-load the resources at each location, whereby synchronization events may be effectuated by requests and/or pings from a server which causes devices at each location to act (e.g., respond). In some embodiments, each location 502a-502n and the storage 506 (and/or its components) can execute an instance of engine 400 in order to effectuate the disclosed synchronization discussed herein.

In some embodiments, running the application comprises, but is not limited to, monitoring file creation, deletion, and revision for files located on the devices, and monitoring file creation, deletion, and revision for the corresponding (versions of) files located in the multi-tenant database. Such monitoring enables version control such that all users are viewing and interacting with the most current versions, which is effectuated through the continuous, bi-directional synchronization functionality discussed herein.

In some embodiments, the synchronization between locations 502a-502n and storage 506 (and storage 506's connected devices/services 508-510, and third party entities services and platforms) can be effectuated via engine 400 being configured to maintain persistent connectivity with storage 506's API(s).

Process 600 will be discussed in accordance with some non-limiting embodiments where a user at a location (e.g., a plant) requests access to an electronic document, edits the document and the edits are synchronized across other locations (both at the plant and other plants) and on/within the cloud storage. One of ordinary skill in the art would understand that it should not be construed as limiting the instant disclosure to such embodiment, as any type of upload, file creation or file access taking part within a synchronization event within, on and over a network can be performed via similar steps, without departing from the scope of the instant disclosure.

Process 600 begins with Step 602 where a user associated with an account requests access to a file stored within a drive in the cloud storage. The drive hosts files for the account, and for purposes of Process 600's disclosure, the user has the required permissions to access the document. In some embodiments, Step 602 can include an additional step (or sub-step) where permissions are checked in order to ensure the user has the required identity to access all or a portion of the requested file(s).

In response to the request, the user is granted access. In some embodiments, the user can access, view and interact with the file via a web-enabled application (e.g., provided by a product from item 508 and/or 510). In some embodiments, Step 602 involves the user downloading a copy or the latest version of the file to his/her device.

In Step 604, information associated with edits or modifications to the file are identified. In some embodiments, the information indicates, but is not limited to, the changes to the documents, the differences between the original (e.g., accessed) and the current state of the document, a user identifier, device and/or location (e.g., 502a-502n) identifier, a location within the file the user is currently viewing/interacting with, and any other type of information associated with the edits and/or editor. In Step 604, therefore, engine 400 identifies that the file has been changed from the version that was provided in Step 602.

In Step 606, input is identified for uploading the updated file and/or edits to storage (e.g., storage 506). In some embodiments, the input can be a product of a continuous synchronization occurring according to a specific criteria as discussed above—for example, periodically, when changes are detected, upon a save or input by a user, or any other form that indicates there are differences between two versions of a file that need to be rectified.

In response Step 606, a synchronization (e.g., "synch") operation is initiated and executed. Step 608. The synch operation causes the document versions at each location and device (e.g., locations 502a-502n) and the version(s) stored in the cloud (e.g., storage 506) to be reconciled so all the versions at each different physical and digital location reflect the same information.

In some embodiments, the synch operation is an upload of edit information that causes the version stored in the cloud drive to updated to reflect the changes. Step 610. The edit information can include the changes such that only the edits are uploaded and the cloud version is updated accordingly. In some embodiments, a new version of the file can be uploaded, such that the stored cloud version is changed to the uploaded file. In some embodiments, such changing involves creating a new version, where the previous unedited version is archived and/or moved to a backup and linked through metadata of the latest version; and in some embodiments, the old version is deleted or moved to cache (for later purging).

In some embodiments, as discussed in relation to Steps 612-614, file storage can implement, for example, a version management API (e.g., provided by cloud OTS 510) to provide versioning for the file.

According to some embodiments, when the user uploads a new file version (Steps 606-608), engine 400 makes the latest version available for access and performs a "rollback" of the old version. In some embodiments, the "rollback" version is still available; however, it must be directly linked to via provided parameters or displayed interface objects according to any known or to be known branch selection protocols, as discussed above (e.g., archived).

Accordingly, in some embodiments, Step 612 involves identifying all versions of the file that are currently being accessed by users, services or other entities (e.g., where the file is "checked out"). In Step 614, a new version is created, as discussed above; and the new version is provided as an update to each "checked out" version. The previous version can be moved to the local cache of the device viewing/accessing the file, and disregarded (e.g., deleted) when the session with the file is ended (as it represents an old version not currently applicable).

As illustrated in FIG. 6, Steps 610 and 614 include lines back to Step 604. This recursive nature embodies the continuous or periodic synchronization that engine 400 is configured to provide within the disclosed cloud environment. This enables updates and changes to documents to be shared across devices, locations, users and platforms. In other words, Process 600, as discussed above, provides a non-limiting example embodiment of file sharing between location to location, cloud to cloud, device to device, device to cloud, cloud to device, network to network, and the like. Process 600 also enables versioning such that all changes to the shared files and/or cloud service accessed by all parties/entities is properly and timely dispersed to each user, device, platform or service.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternative embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving, at a computing device over a network, a request from a first device to access a file stored in a database, the first device being associated with a first location, the database being associated with the computing device;

communicating, by the computing device over the network, a version of the file to the first device;

receiving, by the computing device, from the first device, information indicating that the first device has modified the file version, the information comprising only edits to the file version;

automatically updating, by the computing device, in response to receiving said information, the file stored in said associated database, by:

creating, via the computing device, a new version of the file in response to receiving said information from the first device, the new version being an updated version of the file that includes said edits, and archiving, via branch controls executed by the computing device and associated with said database, said file provided to the first device on said network, such that the created new version is accessible within the database as a latest version of the file;

identifying, by the computing device, upon receiving said information, another version of the file previously communicated to a second device associated with a second location; and automatically communicating, upon identifying the other file version, by the computing device over the network, edit information that is based on the new created new version to the second device, said edit information causing the other file version at the second location to be updated to incorporate the edits performed in said file version at said first location.

2. The method of claim 1, wherein said automatic updating of the file within the database is based on said creating and archiving steps.

3. The method of claim 1, wherein said communicated edit information to the second device comprises information associated with the created new version.

4. The method of claim 1, wherein said computing device interacts with the first and second devices over the network via an application program interface (API) that is associated with and manages the database.

5. The method of claim 1, wherein said computing device comprises functionality for accessing a set of native and third party products, services and platforms, wherein said functionality enables the first device and said second device access to said set of native and third party products, services and platforms.

6. The method of claim 1, wherein said received information from the first device corresponds to a new version of the file created by the first device.

7. The method of claim 1, wherein said second location is the same as said first location.

8. The method of claim 1, wherein said second location is a different location from said first location.

9. The method of claim 1, wherein said second location is a networked location.

10. The method of claim 1, wherein said second location corresponds to a third party cloud service.

11. The method of claim 1, further comprising:
analyzing the request from the first device; and
determining, based on said analysis, whether the first device is permitted to access said file, wherein said communication of the file to the first device is based on said determination.

12. The method of claim 1, wherein the first and the second location each correspond to at least one of a real-world location and an electronic location on the network.

13. The method of claim 1, wherein said receiving said information indicating that the first device has modified the file version from the first device corresponds to a digital event selected from a group consisting of: an upload by the first device, a time period, an auto-save event, detection of a threshold amount of edits being performed, a request from the computing device, and a threshold amount of time passing since a last synchronization by the computing device.

14. A non-transitory computer-readable storage medium tangibly encoded with computer-executable instructions, that when executed by a processor associated with a computing device, performs a method comprising:

receiving, at the computing device over a network, a request from a first device to access a file stored in a database, the first device being associated with a first location, the database being associated with the computing device;

communicating, by the computing device over the network, a version of the file to the first device;

receiving, by the computing device, from the first device, information indicating that the first device has modified the file version, the information comprising only edits to the file version;

automatically updating, by the computing device, in response to receiving said information, the file stored in said associated database, by:

creating, via the computing device, a new version of the file in response to receiving said information from the first device, the new version being an updated version of the file that includes said edits; and archiving, via branch controls executed by the computing device and associated with said database, said file provided to the first device on said network, such that the created new version is accessible within the database as a latest version of the file;

identifying, by the computing device, upon receiving said information, another version of the file previously communicated to a second device associated with a second location; and automatically communicating, upon identifying the other file version, by the computing device over the network, edit information that is based on the new created new version to the second device, said edit information causing the other file version at the second location to be updated to incorporate the edits performed in said file version at said first location.

15. The non-transitory computer-readable storage medium of claim 14, wherein said computing device interacts with the first and second devices over the network via an application program interface (API) that is associated with and manages the database.

16. The non-transitory computer-readable storage medium of claim 14, wherein said computing device comprises functionality for accessing a set of native and third party products, services and platforms, wherein said functionality enables the first device and said second device access to said set of native and third party products, services and platforms.

17. A computing device comprising:
a processor; and
a non-transitory computer-readable storage medium for tangibly storing thereon program logic for execution by the processor, the program logic comprising:
logic executed by the processor for receiving, over a network, a request from a first device to access a file stored in a database, the first device being associated with a first location, the database being associated with the computing device;
logic executed by the processor for communicating, over the network, a version of the file to the first device;
logic executed by the processor for receiving, from the first device, information indicating that the first device has modified the file version, the information comprising only edits to the file version;
logic executed by the processor for automatically updating, upon receiving said information, the file stored in said associated database, by:

creating a new version of the file in response to receiving said information from the first device, the new version being an updated version of the file that includes said edits; and archiving, via branch controls associated with said database, said file provided to the first device on said network, such that the created new version is accessible within the database as a latest version of the file, wherein said automatic updating of the file within the database is based on said creating and archiving steps, and wherein said communicated edit information to the second device comprises information associated with the created new version, logic executed by the processor for identifying, upon receiving said information, another version of the file previously communicated to a second device associated with a second location; and logic executed by the processor for automatically communicating, upon identifying the other file version, over the network, edit information to the second device, said edit information causing the other file version at the second location to be updated to incorporate the edits performed in said file version at said first location.

* * * * *